United States Patent [19]

Chiu et al.

[11] Patent Number: 5,457,453
[45] Date of Patent: Oct. 10, 1995

[54] FOLDING KEYBOARD

[76] Inventors: Wilson L. Chiu, 3545 Fairmont Blvd., Yorba Linda, Calif. 92686; Hau Chung Lam, 11B. Block 4 Beacon Hgts., Lund Ping, Rd., Kowloon, Hong Kong

[21] Appl. No.: 106,597

[22] Filed: Aug. 16, 1993

Related U.S. Application Data

[63] Continuation-in-part of Ser. No. 898,315, Jun. 15, 1992, abandoned.

[51] Int. Cl.$^6$ .................................................. H03K 17/94
[52] U.S. Cl. .................................................. 341/22; 345/169
[58] Field of Search ................ 341/22; 400/489; 200/5 A; 345/168–169; 364/708.1; 361/680

[56] References Cited

U.S. PATENT DOCUMENTS

| 3,940,758 | 2/1976 | Margolin | 341/22 X |
| 4,939,514 | 7/1990 | Miyazaki | 341/22 |
| 4,996,522 | 2/1991 | Sunano | 364/708.1 |
| 5,212,473 | 5/1993 | Louis | 341/22 X |
| 5,227,615 | 7/1993 | Oogita | 364/708.1 X |
| 5,287,245 | 2/1994 | Lucente et al. | 345/168 X |

Primary Examiner—John K. Peng
Assistant Examiner—Thomas J. Mullen, Jr.
Attorney, Agent, or Firm—F. Eugene Logan

[57] ABSTRACT

A keyboard for a miniature computer or other data processing device which permits a standard key spacing to be retained while enabling folding of the keyboard to reduce its overall size for storage or carrying purposes. In another aspect, the thickness of the keyboard when in folded position is reduced in some embodiments by maintaining its keys in depressed positions.

21 Claims, 4 Drawing Sheets

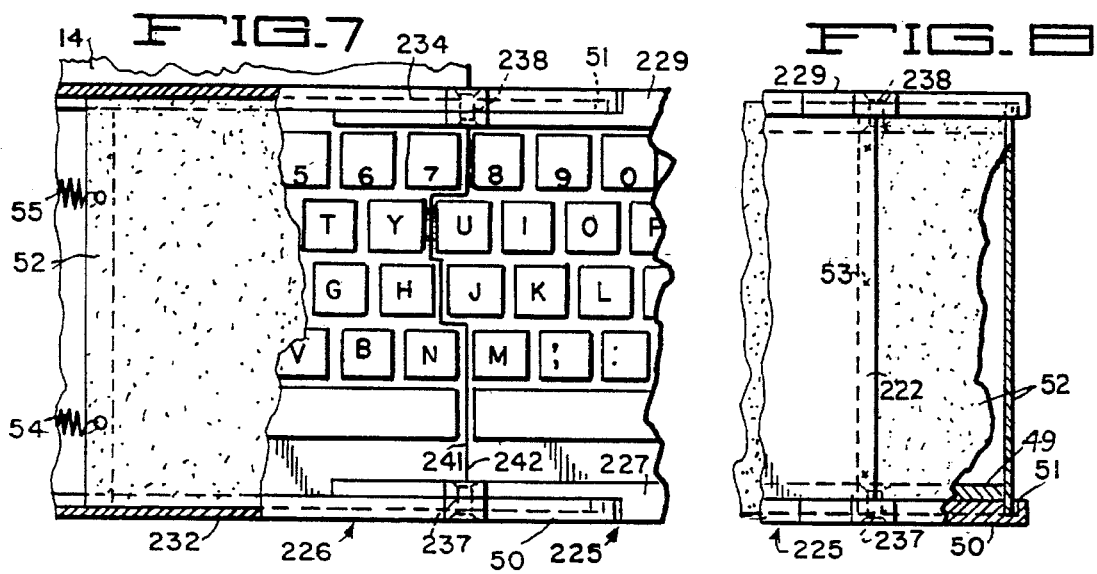
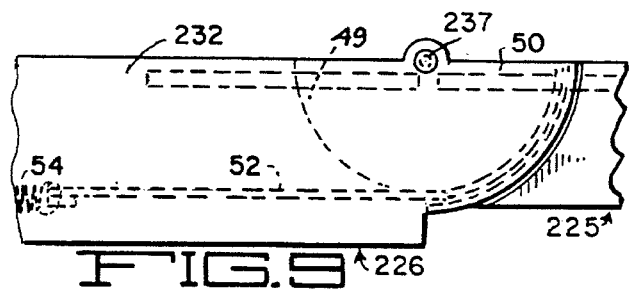
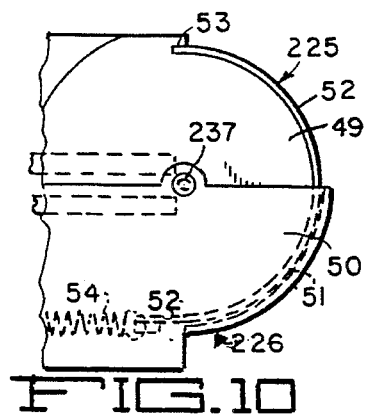
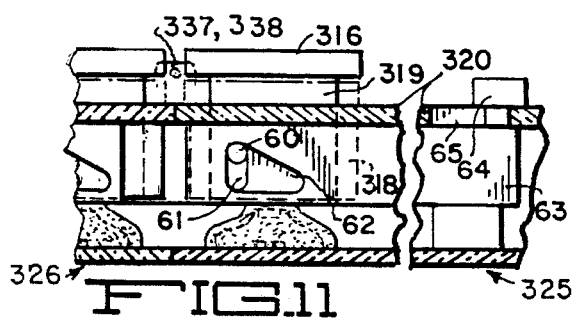
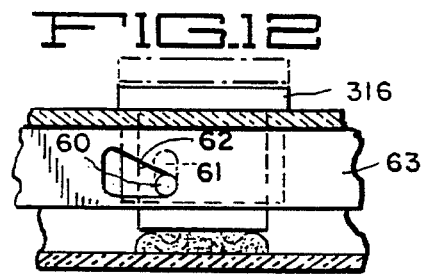
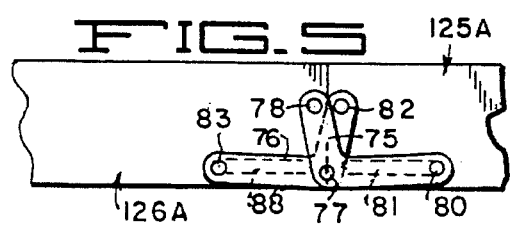
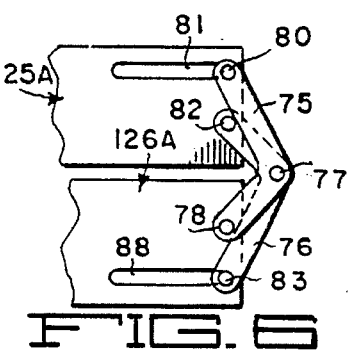

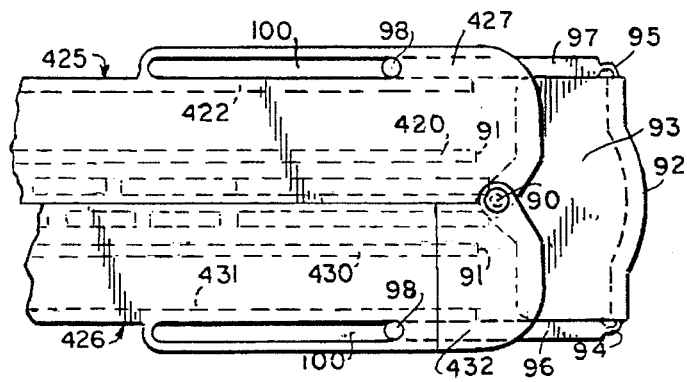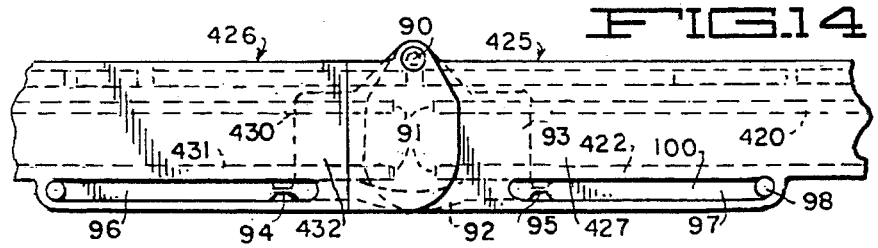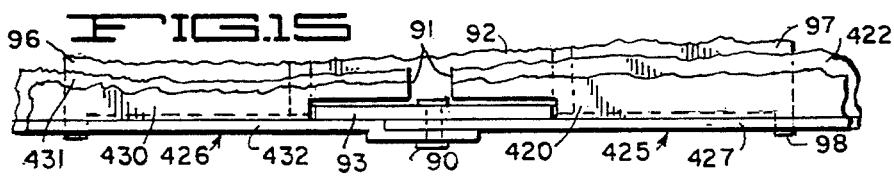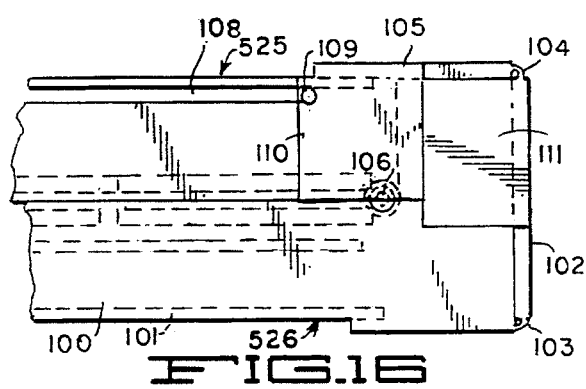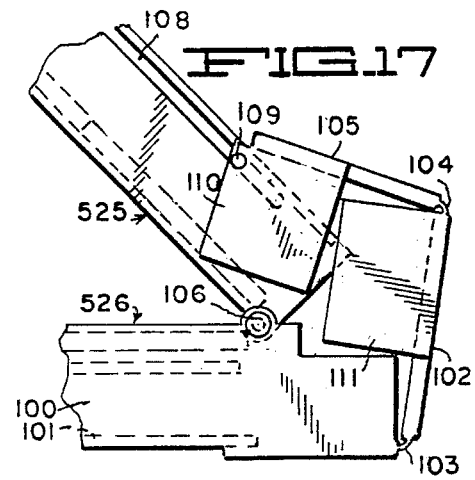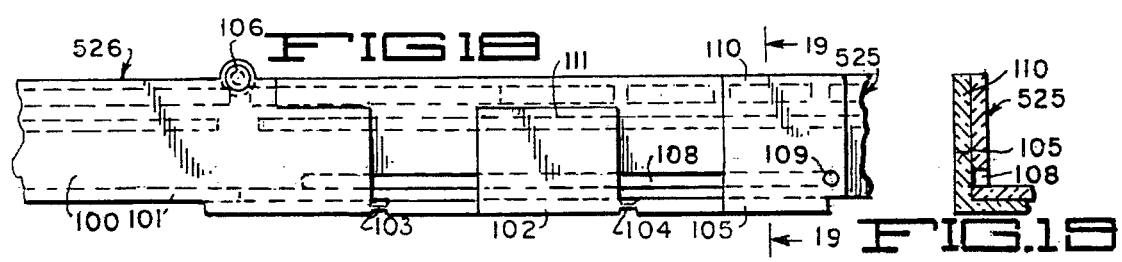

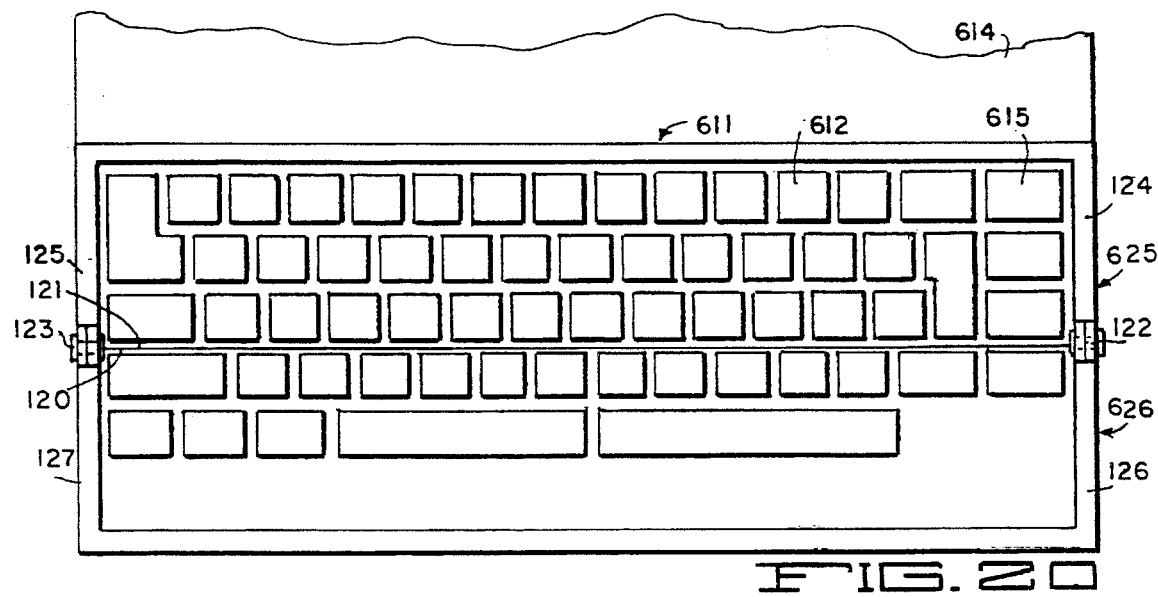
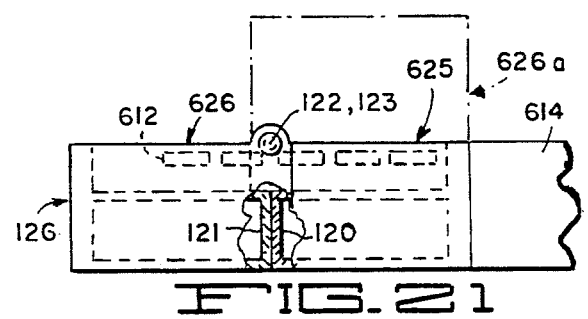

FOLDING KEYBOARD

CROSS-REFERENCE TO RELATED APPLICATIONS

This is a Continuation-In-Part of our application Ser. No. 07/898,315, filed Jun. 15, 1992 now abandoned.

BACKGROUND OF THE INVENTION

1. Field of the Invention

This invention relates to keyboards and has particular reference to keyboards associated with data processing equipment such as computers, typewriters, etc.

2. Description of the Prior Art

The miniaturization of electronic computers, etc., has brought about the desire for corresponding miniaturization of keyboards associated with such equipment. However, the limiting factor in the reduction in size of keyboards is the spacing and size of the keys since the minimum key spacing is dictated by the size of an average operator's fingers.

SUMMARY OF THE INVENTION

Therefore, the principal object of the present invention is to provide a keyboard which is collapsible into a small space, yet will retain a normal key spacing.

Another object is to permit the folding of a keyboard regardless of the type or pattern of its keys.

Another object is to minimize the thickness of a folding keyboard when in folded condition.

Another object is to protect and hide adjacent ends of adjacent units of a folding keyboard when it is in folded condition.

A further object is to provide such a keyboard of simple and inexpensive construction.

According to the invention, the keyboard is divided into two units arranged side by side. The adjoining boundaries of the units are formed to present an unbroken pattern of adjacent keys when the keyboard is unfolded. Thus, in a keyboard in which the key rows are located in the "QWERTY" format found on most computers and typewriters, wherein keys in one row are staggered relative to the keys in an adjoining row, the boundaries of the units follow complementary jagged lines extending between adjacent keys near the center of the keyboard. However, the boundaries of keyboard units of keyboards arranged in different patterns would follow different complementary lines.

One of the keyboard units is pivotally supported to swing about an axis located above the plane of the key tops and in substantial vertical alignment with the boundary lines of the adjoining unit to enable one unit to be swung 180° into a folded position relative to the other without interference.

The keyboard units are of substantially equal width and preferably of a width substantially equal to the width of a computing device to which one of the units is preferably integrally attached.

In certain modified forms of the invention, links are provided to pivotally connect the separate keyboard units, enabling one to be swung 180° into overlapping position relative to the other.

In a further modification, a flexible cover is provided. When the moveable keyboard unit is swung into folded position, the cover is extended over the now separated jagged boundary edges of both units to protect the same and to present a pleasing appearance to the whole.

In another modification, the keys are moved to depressed positions when folding is to occur to result in a relatively thin compact keyboard assembly. When the moveable keyboard unit is subsequently swung to unfolded position, the keys may be returned to undepressed positions.

In yet another modification, an end cover member is pivotally connected to the keyboard units to cover the exposed ends of the units when they are in folded condition and side cover elements are carried by the end cover members and are slidable along the units to further cover the exposed ends of the units.

In a further modification, a pair of end cover members are pivotally connected together and to the two keyboard units in a manner to extend across and cover the exposed ends of the units when in folded condition.

In a still further modification, the keyboard is split along a pivotal axis extending parallel to the lengths of the various rows of keys.

BRIEF DESCRIPTION OF THE DRAWINGS

The manner in which the above and other objects of the invention are accomplished will be readily understood on reference to the following specification when read in conjunction with the accompanying drawings, wherein:

FIG. 5 is a fragmentary elevational view of another modified form of swingable connection between the keyboard units.

FIG. 6 is a view similar to FIG. 5 but showing the moveable keyboard unit in folded condition.

FIG. 7 is a top plan view, partly broken away, of a modified form of the invention, illustrating the same in unfolded condition and showing a flexible cover strip for covering the ends of its separate keyboard units when they are moved to a folded condition.

FIG. 8 is a view similar to FIG. 7 but illustrating the keyboard units in folded condition.

FIG. 9 is a front elevational view, partly broken away, of the keyboard arrangement of FIG. 7 showing the same in an unfolded condition.

FIG. 10 is a front elevational view similar to FIG. 9 but illustrating the keyboard in a folded condition.

FIG. 11 is a sectional elevational view of a modified form of the invention, illustrating means for holding the keys in depressed positions to enable folding of the keyboard into a relatively thin compact package.

FIG. 12 is a view similar to FIG. 9 but showing one of the keys in depressed position.

FIG. 13 is a front elevational view, partly broken away, of a modified form of the invention, showing the keyboard units in folded condition.

FIG. 14 is a view similar to FIG. 13 but showing the keyboard units in unfolded condition.

FIG. 15 is a top plan view, partly broken away, of the modification shown in FIGS. 13 and 14 in unfolded condition.

FIG. 16 is a front elevational view, partly broken away, of another modified form of the invention, showing the keyboard units in folded condition.

FIG. 17 is a view similar to FIG. 16 but showing one of the keyboard units in partly unfolded condition.

FIG. 18 is a view similar to FIGS. 16 and 17 but showing the keyboard units in unfolded condition.

FIG. 19 is a fragmentary transverse sectional view taken along line 19—19 of FIG. 18.

FIG. 20 is a plan view of another modified form of the invention showing the separate keyboard units foldable about an axis extending parallel to the lengths of the key rows.

FIG. 21 is a side view of the keyboard of FIG. 20.

DESCRIPTION OF THE EMBODIMENT SHOWN IN FIG. 1 AND 2

The keyboard, generally indicated at 11, is comprised of a plurality of depressible data entry keys 12 arranged in rows 13 according to the "QWERTY" format wherein the keys of one row are staggered relative to the keys in other rows.

The keyboard 11 is shown as integrally associated with a miniature computing or other data processing device generally indicated at 14, and function keys 15 are provided in addition to the data entry keys 12 to control the computing device.

Figure 2:
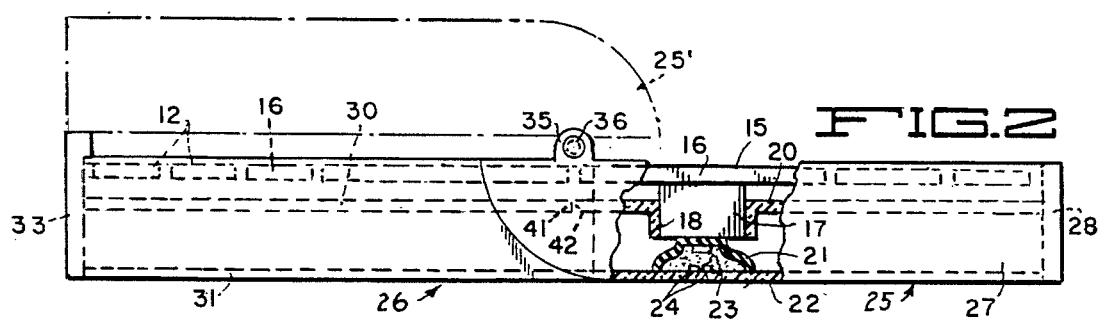
FIG. 2 is a front elevational view of the keyboard, partly in section.

As seen in FIG. 2, the keys 12 and 15 have key tops 16 normally extending in a common plane, each key including a key stem 17 slidably mounted in a bearing 18 formed in a key plate 20. Each key is normally held in its illustrated raised position by an elastomeric spring member 21 which rests on a bottom key plate 22 preferably formed of electrically insulated material. Upon depression of a key, the member 21 will yield and a contact 23 carried thereby will bridge two or more stationary contacts 24 on the plate to complete a suitable circuit (not shown) leading to an appropriate circuit in the computing device 14.

It will be noted that the keyboard is divided into two similar units generally indicated at 25 and 26.

The right-hand keyboard unit 25 comprises the aforementioned key plates 20 and 22 held in spaced relation by front, side and rear walls 27, 28 and 29, respectively. The left-hand keyboard unit 26 similarly comprises a key top plate 30, a bottom key plate 31 and front, side and rear walls 32, 33 and 34, respectively.

The front walls 27 and 32 have upstanding lugs 35 which are connected by a pivot pin 36 and the rear walls 29 and 34 are likewise provided with lugs 37 connected by a pivot pin 38. The pins 37 and 38 are aligned with each other to form a folding axis 40 located slightly above and parallel to the plane of the key tops 16.

The key plates 20 and 30 of the two keyboard units are formed along complementary jagged edges 41 and 42 which extend between adjacent keys 12 and 15 in the central part of the keyboard. Parts of such edges are either vertically aligned with the folding axis 40 or are close thereto.

It will be noted that the keyboard units 25 and 26 are of similar width and at least substantially equal to the width of the computing device 14. The unit 26 is integrally attached to the device 14 in a manner not shown. Thus, when the right-hand unit 25 is swung about axis 40 into its folded condition shown by dot-dash lines 25' the width of the keyboard will substantially equal the width of the computing device but when the unit 25 is swung to its unfolded position of FIG. 1 it will be a normal size keyboard.

KEYBOARD OF MODIFIED EMBODIMENT SHOWN IN FIG. 3 AND 4

Figure 3:
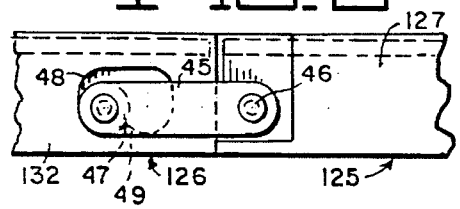
FIG. 3 is a fragmentary elevational view of a modified form of a swingable connection between the keyboard units.
Figure 4:
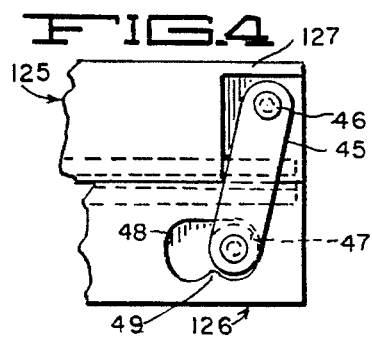
FIG. 4 is a fragmentary view similar to FIG. 3 but showing the moveable keyboard unit in folded condition.

FIG. 3 and 4 illustrate a modified form of pivotal connection between right- and left-hand keyboard units 125 and 126. A link 45 is pivoted at 46 to the front wall 127 of keyboard unit 125. A roller 47 carried by link 45 engages a relatively wide slot 48 formed in the front wall 132 of the left-hand keyboard unit 126. A similar linkage connection (not shown) is provided between the rear walls of the keyboard units.

The roller 47 normally rests in a detent pocket formed in the slot 48 by a shoulder 49. By pulling the keyboard unit 125 to the right, the roller 47 is moved to the right-hand end of the slot 48 into a detent pocket also formed by shoulder 49, as shown in FIG. 4, enabling the unit 125 to be swung about pin 46 into its folded position of FIG. 4.

DESCRIPTION OF MODIFIED EMBODIMENT SHOWN IN FIG. 5 AND 6

FIG. 5 and 6 show another modified form of swingable connection between right- and left-hand keyboard units 125A and 126A. A pair of levers or bell cranks 75 and 76 are pivoted together at 77 on one side of the keyboard. Bell crank 75 is pivoted to unit 126A at 78 and has a pin 80 slidable along slot 81 in unit 125A. Likewise, bell crank 76 is pivoted at 82 to unit 125A and has a pin 83 slidable along slot 88 in unit 126A.

Normally, when in unfolded position shown in FIG. 5, the unit 125A abuts unit 126A to maintain the keys (not shown) carried thereby in a common plane. However, by swinging the unit 125A upward the bell cranks 75 and 76 will guide the same into a folded position relative to the unit 126A as shown in FIG. 6.

A similar swingable connection is provided on the opposite side of the keyboard.

Thus, it will be seen that the pivotal connections comprising bell cranks 75 and 76 will be effective to guide the keyboard unit 125A into overlapping or folded position relative to unit 126A but will be located below the level of such units when they are in their unfolded operating condition of FIG. 5 and will therefore not interfere with an operator depressing the different keys.

DESCRIPTION OF MODIFIED EMBODIMENT SHOWN IN FIG. 7 TO 10

Figure 1:
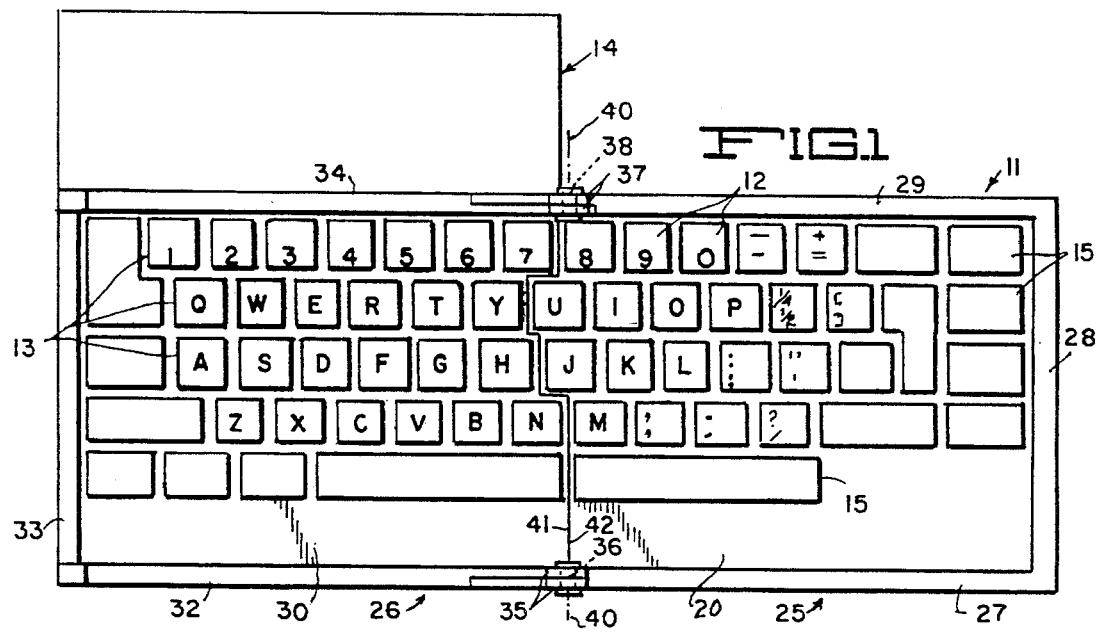
FIG. 1 is a plan view of a keyboard embodying the present invention associated with a computing device, the keyboard being shown in unfolded operating condition.

FIG. 7 to 10 illustrate a modified form of the invention in which the keyboard is separated into right- and left-hand units generally indicated at 225 and 226 along complementary jagged edges 241 and 242, similar to jagged edges 41 and 42 of FIG. 1 and 2.

The front and rear keyboard walls 227 and 229 of the unit 225 are connected to the corresponding walls 232 and 234 of the unit 226 by aligned pivot pins 237 and 238 to permit folding of the unit 225 into its folded position shown in FIG. 8 and 10.

The walls 232 and 234 of unit 226 have arcuate extensions 50 extending concentrically about the pivot pins 237 and 238. Inwardly facing arcuate grooves 51 are formed in the wall extensions 50 and along the walls 232 and 234 to slidably receive a thin flexible cover strip 52 of plastic, cloth or the like. The latter is suitably secured at 53 to one end of the bottom wall 222 of the right-hand keyboard unit 225. The cover strip 52 extends over arcuate portions of extensions 49 of the front and rear walls, 227 and 229, and tension springs 54 and 55 are connected between the opposite end of the cover strip 52 and a suitable part of the keyboard unit 226 to maintain the cover strip in a taut condition. Thus, when the keyboard unit 225 is swung into its folded position of FIG. 8 and 10 the cover strip 52 will be drawn through the grooves 51 and over the arcuate portions 49 to protect the exposed and jagged edges 241 and 242 of the two keyboard units and to present a rounded pleasing appearance. When the unit 225 is swung to its unfolded position as shown in FIG. 7, the cover strip 52 will be drawn within the keyboard unit 226 where it is hidden from view.

DESCRIPTION OF THE MODIFIED EMBODIMENT SHOWN IN FIG. 11 AND 12

FIG. 11 and 12 illustrate a further embodiment in which the various keys of the right- and left-hand keyboard units 325 and 326 are moved to depressed positions pursuant to folding of the keyboard units so that the overall thickness of the keyboard may be reduced when in folded condition while allowing a normal key stroke when the keyboard is unfolded. For this purpose, each of the data entry and function keys, such as shown at 316, has a pin 60 extending from the stem 319 thereof and passing through a vertical slot 61 in the respective keyboard bearing 318. The various pins 60 of those keys in an aligned row also engage camming slots 62 formed in a slide bar 63 suitably supported in a manner not shown for endwise movement.

A knob 64 is attached to slide bar 63 and extends through a slot 65 in the key top plate 320. When moving the slide bar 63 to the left from its FIG. 11 position, the camming slots 62 will cam all of the keys associated with slide bar 63 into fully depressed positions as seen in FIG. 12, thus reducing the thickness of the keyboard. A separate slide bar (not shown) similar to slide bar 63 is provided for each row of keys and suitable means (not shown) can be provided to move all such cam bars in unison.

The foregoing arrangement enables the pivot or folding axis of the two keyboard units 325 and 326, as formed by aligned pivot pins 337, 338, to be located below the plane of the key tops 316 when in depressed positions, as shown in full lines in FIG. 11, resulting in a relatively thin, compact package when the keyboard is in folded condition.

DESCRIPTION OF MODIFIED EMBODIMENT SHOWN IN FIG. 13 TO 15

FIG. 13 to 15 illustrate another modified form of the invention in which right- and left-hand keyboard units, 425 and 426, similar to units 25 and 26 in FIG. 1, are provided.

The front wall 427 of unit 425 is pivotally connected to the front wall 432 of the unit 426 by a pivot pin 90. Likewise, the rear walls (not shown) of the units are similarly pivotally connected by a pivot pin extending coaxial with pin 90 to enable swinging of the unit 425 between its folded position shown in FIG. 13 and its unfolded position shown in FIG. 14.

It will be noted that the adjacent ends of the walls 427 and 432 overlap and the top key plates 420, 430 and bottom key plates 422, 431 terminate inwardly from the ends of these walls, as indicated at 91, to enable complete unfolding of the unit 425.

For the purpose of covering and protecting the edges of the units 425 and 426 when in folded condition, an end cover member 92, preferably formed of a relatively rigid plastic material, such as polypropylene, is provided having end walls at opposite ends, one of which is shown at 93. The latter are pivotally supported by the aligned pivot pins 90 to swing independently of the keyboard units 425 and 426. The cover member 92 is reduced in thickness at 94 and 95 to form hinges for pivotally supporting side cover elements 96 and 97, respectively. The latter are slidable along the bottom key plates 422 and 431 of the respective keyboard units 425 and 426, and for this purpose, each cover element is formed with coaxial laterally extending studs 98, which are guided along slots 100 formed in the respective front and rear walls of units 425 and 426. Thus, as the keyboard unit 425 is swung into its folded condition of FIG. 13, the cover elements 96 and 97 will slide along the respective keyboard units 425 and 426 to cover the otherwise exposed ends of the units.

DESCRIPTION OF MODIFIED EMBODIMENT OF FIG. 16 TO 19

FIG. 16 to 19 illustrate another embodied form of the invention in which right- and left-hand keyboard units 525 and 526, similar to units 25 and 26, respectively, of FIG. 1 are provided.

The unit 526 comprises a front wall 100 and a similar rear wall (not shown) joined by a bottom key plate 101. The latter unit is preferably formed of a relatively rigid plastic, such as polypropylene, and is integrally connected to an end cover member 102 by a section 103 of reduced thickness forming a hinge joint. Cover member 102, in turn, is connected through a second hinge joint 104 to a second end cover member 105.

The right-hand keyboard unit 525 is pivotally connected to the left-hand unit 526 by a pivot pin 106 enabling it to be swung between its folded position depicted in FIG. 16 to its unfolded position of FIG. 18.

The unit 525 is also provided with slots, one of which is shown at 108, in its front and rear walls which slidably embrace coaxial pins 109 extending from side walls 110, which extend from opposite sides of the cover member 105.

In pivoting the keyboard unit 525 to its unfolded position of FIG. 18, the pin and slot connections 108, 109 cause the cover members 102 and 105 to rotate about their hinges 104 and 103 to assume the aligned position shown in FIG. 18. During this movement, the unit 525 fits between the side walls 110 on cover member 105 and similar side walls 111 on cover member 102.

It will be noted that when the keyboard unit 525 is swung into its folded position of FIG. 16, the cover members 102 and 105 nest together against the adjacent ends of both keyboard units 525 and 526, thus covering the same to exclude entrance of dust and dirt and to present a pleasing appearance. It can be seen in FIG. 16 that when keyboard unit 525 is in its folded position, that cover member 102 forms a flat surface over the end of keyboard unit 525 and the end of keyboard unit 526 which enables the keyboard units to be stood vertically upon the outer flat surface of cover member 102.

DESCRIPTION OF MODIFIED EMBODIMENT SHOWN IN FIG. 20 AND 21

FIG. 20 and 21 illustrate another embodiment employing a keyboard 611 similar to that shown in FIG. 1. However, the keyboard is divided into two units 625 and 626 having mating edge walls 120 and 121, respectively, which extend between and parallel to two of the rows of keys 612 and 615.

Coaxially aligned pins 122 and 123 pivotally connect side walls 124, 125 of keyboard unit 625 to side walls 126, 127 of unit 626. Such pins are located slightly above the tops of the keys 612 and 615 enabling the unit 626 to be swung between its unfolded position shown in full lines in FIG. 21 and its folded position shown in dot-dash lines 626a.

In the various aforementioned embodiments, it is assumed that the immovable keyboard unit of each is integrally connected to a computer or like device as indicated at 14 in FIG. 1 and at 614 in FIG. 20. However, as another aspect of the invention, the keyboard unit in such embodiments could be physically separated from the device 14 or 614 and the various keys could be remotely connected to the device or to any other device through flexible wire circuits or the like.

It will be seen from the foregoing that we have provided a novel keyboard structure which enables the keys to be spaced apart the normal spacing to permit unhindered operation by an operator's fingers while presenting a small compact package when folded. Although the folding keyboard of this invention has special utility for use on miniaturized computers or the like, it will be apparent that it has applicability for use on computers of larger size as well.

We claim:

1. Folding keyboard means comprising:

a first keyboard unit having a plurality of first touch responsive keys;

a second keyboard unit having a plurality of second touch responsive keys;

a first axle bearing member for the first keyboard unit, the first axle bearing member being positioned proximate one side of the first keyboard unit and rigidly attached thereto;

a first axle bearing member for the second keyboard unit which is positioned proximate one side of the second keyboard unit and rigidly attached thereto, the first axle bearing member for the second keyboard unit being adjacent the first axle bearing member for the first keyboard unit;

a first axle pivotally connecting the first axle bearing members;

a second axle bearing member for the first keyboard unit, the second axle bearing member being positioned proximate the opposite side of the first keyboard unit and rigidly attached thereto;

a second axle bearing member for the second keyboard unit which is positioned proximate the opposite side of the second keyboard unit and rigidly attached thereto, the second axle bearing member for the second keyboard unit being adjacent the second axle bearing member for the first keyboard unit;

a second axle pivotally connecting the second axle bearing members, the first and second axles being coaxial, the first and second axle bearing members and the first and second axles permitting the folding keyboard means to be (i.) opened to an operating position in which an end of the second keyboard unit lies adjacent a corresponding end of the first keyboard unit, and (ii.) folded to a folded storage position in which the second keyboard unit is folded over the first keyboard unit; and wherein the tops of the plurality of first and second keys are at about the same height when the folding keyboard means is in the operating position, wherein the height of the axis of the coaxial axles is proximate the height of the tops of the keys, wherein the ends of the units have complementary jagged edges, and wherein the plurality of first and second keys are arranged in staggered rows in an unbroken pattern when the folding keyboard means is in the operating position.

2. The folding keyboard means of claim 1, further comprising a data processing unit integral with said first keyboard unit, said first keyboard unit having a width substantially equal to the width of said data processing unit, and said second keyboard unit having a width substantially equal to the width of said first keyboard unit.

3. Folding keyboard means comprising:

a first keyboard unit having a plurality of first touch responsive keys;

a second keyboard unit having a plurality of second touch responsive keys;

a first axle bearing member for the first keyboard unit, the first axle bearing member being positioned proximate one side of the first keyboard unit and rigidly attached thereto;

a first axle bearing member for the second keyboard unit which is positioned proximate one side of the second keyboard unit and rigidly attached thereto, the first axle bearing member for the second keyboard unit being adjacent the first axle bearing member for the first keyboard unit;

a first axle pivotally connecting the first axle bearing members;

a second axle bearing member for the first keyboard unit, the second axle bearing member being positioned proximate the opposite side of the first keyboard unit and rigidly attached thereto;

a second axle bearing member for the second keyboard unit which is positioned proximate the opposite side of the second keyboard unit and rigidly attached thereto, the second axle bearing member for the second keyboard unit being adjacent the second axle bearing member for the first keyboard unit;

a second axle pivotally connecting the second axle bearing members, the first and second axles being coaxial, the first and second axle bearing members and the first and second axles permitting the folding keyboard means to be (i.) opened to an operating position in which an end of the second keyboard unit lies adjacent a corresponding end of the first keyboard unit, and (ii.) folded to a folded storage position in which the second keyboard unit is folded over the first keyboard unit; and cover means pivotally attached to at least one of the keyboard units, the cover means (i.) covering the ends of the keyboard units when the folding keyboard means is in the folded storage position, and (ii.) uncovering the ends of the keyboard units when the folding keyboard means is in the operating position.

4. The folding keyboard means of claim 3, wherein the ends of the units have complementary jagged edges, and wherein the plurality of first and second keys are arranged in staggered rows in an unbroken pattern when the folding keyboard means is in the operating position.

5. The folding keyboard means of claim 3, wherein the keyboard units are electrically interconnected by means for electrically interconnecting the units, and the means for electrically interconnecting the units is covered when the folding keyboard means is in the operating and the folded storage positions and all positions therebetween.

6. The folding keyboard means of claim 3, wherein the tops of the plurality of first and second keys are at about the same height when the folding keyboard means is in the operating position, and wherein the height of the axis of the coaxial axles is proximate the height of the tops of the keys.

7. The folding keyboard means of claim 3, wherein the cover means is pivotally connected to the first and second keyboard units by the first and second axles.

8. The folding keyboard means of claim 3, wherein the cover means comprises:
- a first cover member pivotally connected to the first keyboard unit,
- a pair of opposing first side walls fixed to, and perpendicular to, the first cover member,
- a second cover member pivotally connected to the first cover member,
- a pair of opposing second side walls fixed to, and perpendicular to, the second cover member,
- a side slot in opposing sides of the second keyboard unit, and
- each of the opposing second side walls having a pin slideably retained in the side slot.

9. The folding keyboard means of claim 8, wherein said cover means forms a flat cover surface over the abutting ends when said folding keyboard means is in the folded storage position thereby enabling said folding keyboard means to be stood vertically upon said flat cover surface.

10. The folding keyboard means of claim 8, wherein said cover means completely covers the abutting ends when said folding keyboard means is in the folded storage position.

11. The folding keyboard means of claim 3, wherein first and second keys extend in parallel rows and the axis of said first and second axles is parallel to the lengths of said parallel rows.

12. Folding keyboard means comprising:
- a first keyboard unit carrying a plurality of first touch responsive keys;
- a second keyboard unit carrying a plurality of second touch responsive keys;
- pivotal supporting means supporting said second keyboard unit for movement between (i.) an operating position in which an end of the second keyboard unit lies adjacent a corresponding end of the first keyboard unit, and (ii.) a folded storage position in which the second keyboard unit is folded over the first keyboard unit, said pivotal supporting means comprising:
    - first pivot means positioned at one side of each of the pluralities of first and second touch responsive keys and pivotally connecting the first and second keyboard units at a first single pivot point, and
    - second pivot means positioned at the opposite side of each of the pluralities of first and second touch responsive keys and pivotally connecting the first and second keyboard units at a second single pivot point,
    - the pivot axes of the first and second pivot means being coaxial;
- a cover member;
- supporting means for supporting said cover member to extend across the ends of the keyboard units when they are in the folded storage position; and
- side cover elements rigidly connected to said cover member, said cover member and said side cover elements covering said ends when said folding keyboard means is in said folded storage position.

13. The folding keyboard means of claim 12, further including means for guiding said cover member in sliding engagement with the second keyboard unit.

14. Folding keyboard means comprising:
- a first keyboard unit carrying a plurality of first touch responsive keys;
- a second keyboard unit carrying a plurality of second touch responsive keys;
- supporting means for supporting said second keyboard unit and permitting movement thereof (i.) from an operating position in which an end of said second keyboard unit lies in abutting relationship with a corresponding end of said first keyboard unit (ii.) to a folded storage position in which said plurality of second touch responsive keys is folded over said plurality of first touch responsive keys, said supporting means comprising pivot means for permitting pivotal movement of the second keyboard unit with the first keyboard unit;
- a flexible cover member;
- first connecting means for connecting one end of said flexible cover member to an end of one of said keyboard units;
- second connecting means for connecting the opposite end of said flexible cover member to the other one of said keyboard units, said second connecting means comprising spring tensioning means for maintaining said flexible cover member taut at all times;
- guide means for guiding said flexible cover member in a predetermined path upon movement of said second keyboard unit between said operating and said folded storage positions, said guide means guiding said flexible cover member in an arc concentric with the pivot axis of said pivot means, whereby when said second keyboard unit is moved to said folded storage position said flexible cover member is drawn over the ends of said keyboard units, which lie in said abutting relationship when said second keyboard unit is in said operating position, thereby preventing said ends from being exposed.

15. The folding keyboard means of claim 14, wherein the ends of the units have complementary jagged edges, and wherein the plurality of first and second keys are arranged in staggered rows in an unbroken pattern when the folding keyboard means is in the operating position.

16. Folding keyboard means comprising:
- a first keyboard unit carrying a plurality of first keys;
- a second keyboard unit carrying a plurality of second keys;
- supporting means for supporting said second keyboard unit for movement between (i.) a first position wherein the tops of all of the keys of the first and second keyboard units lie in a common plane, and (ii.) a second position wherein said plurality of second keys are folded over said plurality of first keys;
- spring means for normally maintaining all of the aforesaid keys in raised positions; and
- means for selectively moving all of the first and second keys into depressed positions.

17. The folding keyboard means of claim 16, wherein said means supporting said second keyboard unit comprises pivot means whose pivot axis lies below the plane of the key tops when the keys are in raised positions and lies above the plane of said key tops when said keys are in depressed positions.

18. The folding keyboard means of claim 17, wherein said means for selectively moving said keys into depressed positions comprises camming means for camming said keys into said depressed positions.

19. The folding keyboard means of claim 18, wherein said camming means comprises camming members disposed for manual movement in a predetermined direction at right angles to the direction of movement of said keys, and connecting means between said camming members and each of said keys, whereby movement of said camming members in said predetermined direction at right angles to the direction of movement of said keys cams all of said keys into said depressed positions.

20. The folding keyboard means of claim 16, further including a computing device integral with said first keyboard unit, said first keyboard unit having a width substantially equal to the width of said computing device, and said second keyboard unit having a width substantially equal to the width of said first keyboard unit.

21. Folding keyboard means comprising:

a first keyboard unit carrying a plurality of first touch responsive keys;

a second keyboard unit carrying a plurality of second touch responsive keys; and pivotal supporting means supporting said second keyboard unit for movement between an operating position and a folded storage position, said pivotal supporting means comprising:

a pair of levers, pivotal means for pivotally connecting said levers together, each of said levers being pivotally connected at one end to a respective one of said keyboard units and connected by a pin and slot arrangement to the other of said keyboard units, thereby permitting the second keyboard unit to be moved between said operating position and said folded storage position.

* * * * *